United States Patent [19]
McKinnon et al.

[11] Patent Number: 5,890,582
[45] Date of Patent: Apr. 6, 1999

[54] BALL DECK

[75] Inventors: Laura Lynn McKinnon; Chunguang Yuan; Michael A. Leon, all of Orlando, Fla.

[73] Assignee: FMC Corporation, Chicago, Ill.

[21] Appl. No.: 670,029

[22] Filed: Jun. 25, 1996

[51] Int. Cl.⁶ .................................................. B65G 13/06

[52] U.S. Cl. .............................. 198/781.04; 193/35 MD; 198/787; 198/789; 198/371.3

[58] Field of Search ................... 193/35 MD; 198/369.1, 198/370.01, 371.3, 781.04, 787, 789, 722, 780

[56] References Cited

U.S. PATENT DOCUMENTS

| | | | |
|---|---|---|---|
| 4,036,345 | 7/1977 | Webb | 193/35 MD |
| 4,706,793 | 11/1987 | Masciarelli | 193/35 MD |
| 5,160,017 | 11/1992 | Goodman et al. | 198/787 |

*Primary Examiner*—Joseph E. Valenza
*Assistant Examiner*—Mark Deuble
*Attorney, Agent, or Firm*—Ronald C. Kamp

[57] ABSTRACT

An improved ball deck having a plurality of driven balls arranged in rows, with each driven ball supported on a freely rotatable ball and a pair of drive wheels secured to parallel shafts positioned on either side of the driven balls in each row, and a tray for each row of driven balls having bearings in the end plates thereof. Chain drive sprockets attached to each of the shafts with adjustment means for adjusting the trays to control the tension in the chains.

6 Claims, 6 Drawing Sheets

BALL DECK

This invention relates to ball decks, generally, and more particularly to such decks which utilize a plurality of spherical balls, each supported for free rotation about any horizontal axis and driven by a wheel or collar affixed to a driving shaft on either side of the spherical ball.

Ball decks employ a plurality of driven balls protruding above the desk plates forming the surface of the deck to engage a container or pallet to be conveyed thereby. Each driven ball is supported at three points; two being a pair of driving wheels and the third a freely rotatable ball, as disclosed in U.S. Pat. Nos. 5,147,032 and 5,160,017. The directions of rotation of the two driving wheels determine the direction of rotation of the driven ball and hence the direction the container will be conveyed. To provide the needed support for the driven ball and the shafts to which the wheels are connected, as well as the spring-loaded ball, or ballmat, supporting the driven ball, prior ball decks employed an individual casting for each ball, which arrangement was expensive and difficult to adjust. Since the castings were adjustable, the driven balls supported thereby projected through the deck plate with slightly uneven spacing along the length of the shafts supporting and driving the wheels. In addition, the shafts are driven by chains which required adjustment laterally. i.e. transverse to the length of the shafts, to properly tension the chain. The resulting variability make it difficult to fit deck plates so that the openings therein properly register with the driven balls.

The present invention provides a ball deck which reduces or eliminates the use of castings, which is self-fixturing for welding and can be manufactured and assembled relatively inexpensively and simply, which has drive means that is readily alignable with the drive motors, which incorporates a deck plate easily registerable with the associated driven balls regardless of the adjustment required to align the drive means, and which incorporates a means for attaching the deck plate so that the upper surface thereof is flat and uncluttered and is less susceptible to wear. These attributes of the present invention, and many of the attendant advantage thereof, will become more readily apparent from a perusal of the following description of a preferred embodiment of the present invention and the accompanying drawings, wherein:

Figure 1:
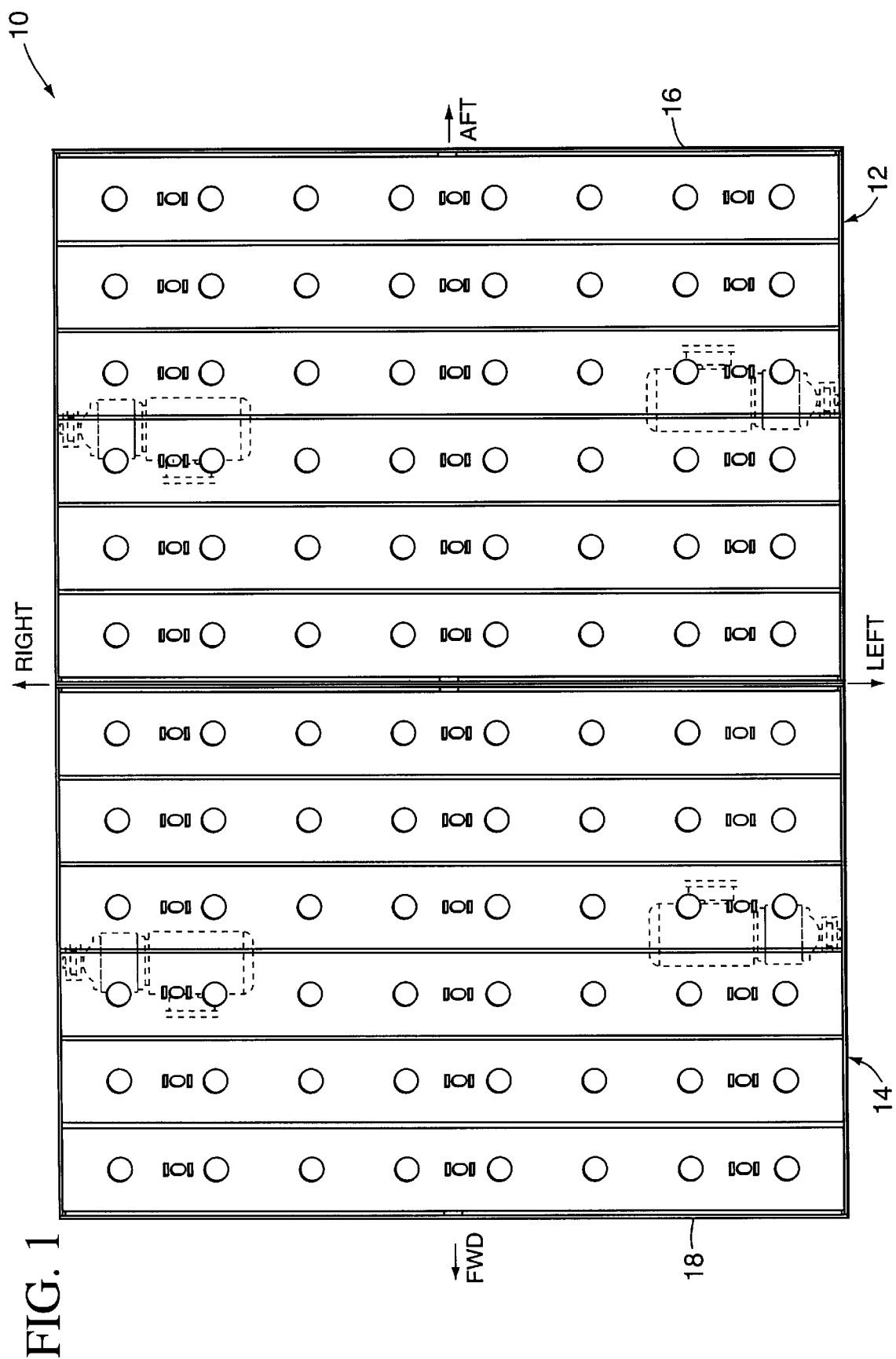
FIG. 1 is a top plan view of a ball deck according to the present invention.
Figure 2:
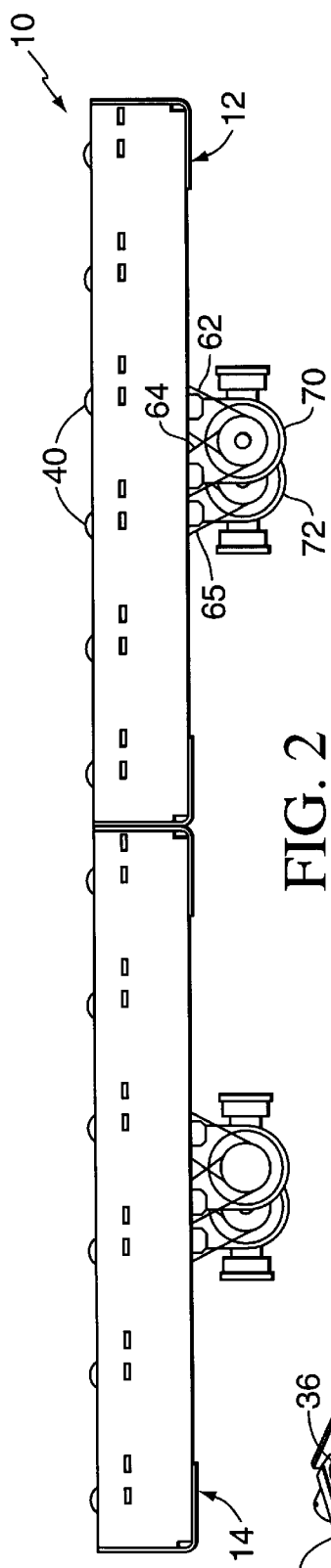
FIG. 2 is a side elevational view of the deck shown in FIG. 1.

Referring now to FIGS. 1 and 2, there is shown a ball deck, indicated generally at 10, which may be composed of two half decks 12 and 14, each of which has an encircling rigid side frame 16 and 18 respectively. The full deck 10 is formed by joining the half decks 12 and 14 together, such as by bolting adjacent edges of their respective side frames. Use of two half decks, where each half is driven by different and independently controllable motors permits rotation, about an essentially vertical axis, of a container resting on the two half decks. A deck so constructed can also shift a container to the left, right, forward and aft, in addition to rotate the container. If rotation is not a needed or desired function, a single half deck may be scaled to perform shifting or conveying in all four directions, as indicated by the arrows labeled LEFT, RIGHT, FWD and AFT in FIGS. 1 and 3. Thus, a description of what is referred to as a half deck will suffice for a complete understanding of the invention.

Figure 4:
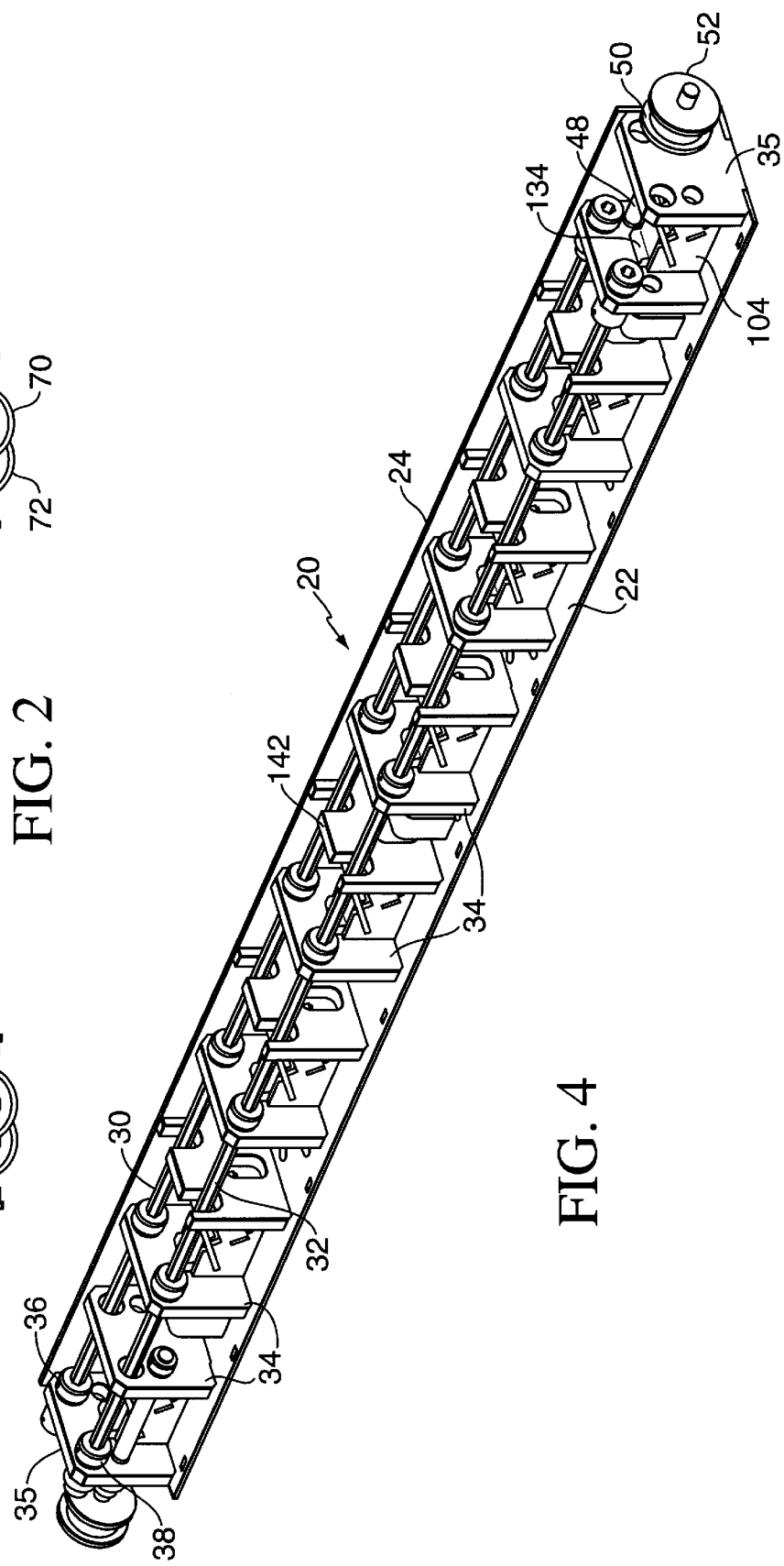
FIG. 4 is an isometric view of one of the trays, with the near side plate of the weldment removed for clarity, incorporated into the deck shown in FIGS. 1 and 3.
Figures 5, 6:
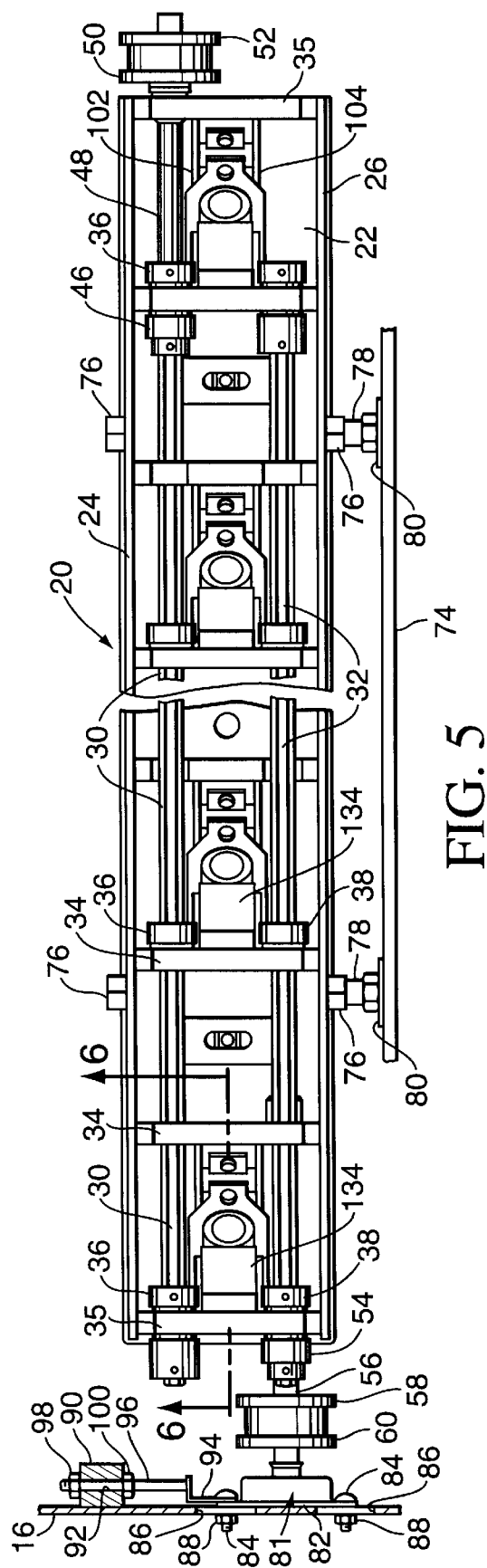
FIG. 5 is a top plan view, with portions broken away and eliminated for clarity, of the tray shown in FIG. 4.
FIG. 6 is a sectional view taken on line 6—6 of FIG. 5.
Figure 7:
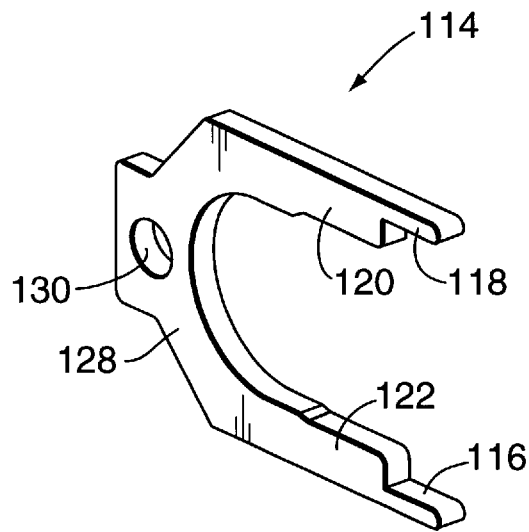
FIG. 7 is an isometric view of the clip used to retain the spring-loaded support ball shown in FIG. 6.

The half deck 12, which will hereafter be referred to as simply a deck, has six trays 20, each of which has a bottom plate 22 with side plates 24 and 26 affixed thereto. The bottom plate 22 rests upon a plurality of box beams, one of which is shown at 28 in FIG. 3, extending transverse to the trays and affixed to opposite portions of the side frame 16 to form a part of the frame for the deck 12. The bottom plate 22 is releaseably secured by conventional means, such as bolts extending through slots in the bottom plate 22 and slots transverse thereto in a flange 27 welded or otherwise secured to three of the beams 28 positioned intermediate the frame, to engage nuts, and thereby permit selective positioning of the tray relative to the frame. As shown in FIGS. 4 and 5, right and left parallel drive shafts 30 and 32, which may be hexagonal in cross section, are rotatably supported in bearings in a plurality of support members 34 spaced along the length of and affixed to the bottom plate 22 of the tray 20. Similar support members 35 are secured to the bottom plate 22 to form the ends of the tray 20. A plurality of drive wheels 36 and 38 are secured to the drive shafts 30 and 32 respectively. The wheels 30 and 32 are arranged in pairs to support and drivingly engage a plurality of driven balls 40, one of which is shown in dotted lines in each of FIG. 6. The third point of support for each driven ball 40 is a freely rotatable support ball 42 held in a supportive retainer 44, an assembly often referred to as a "ballmat."

Figure 3:
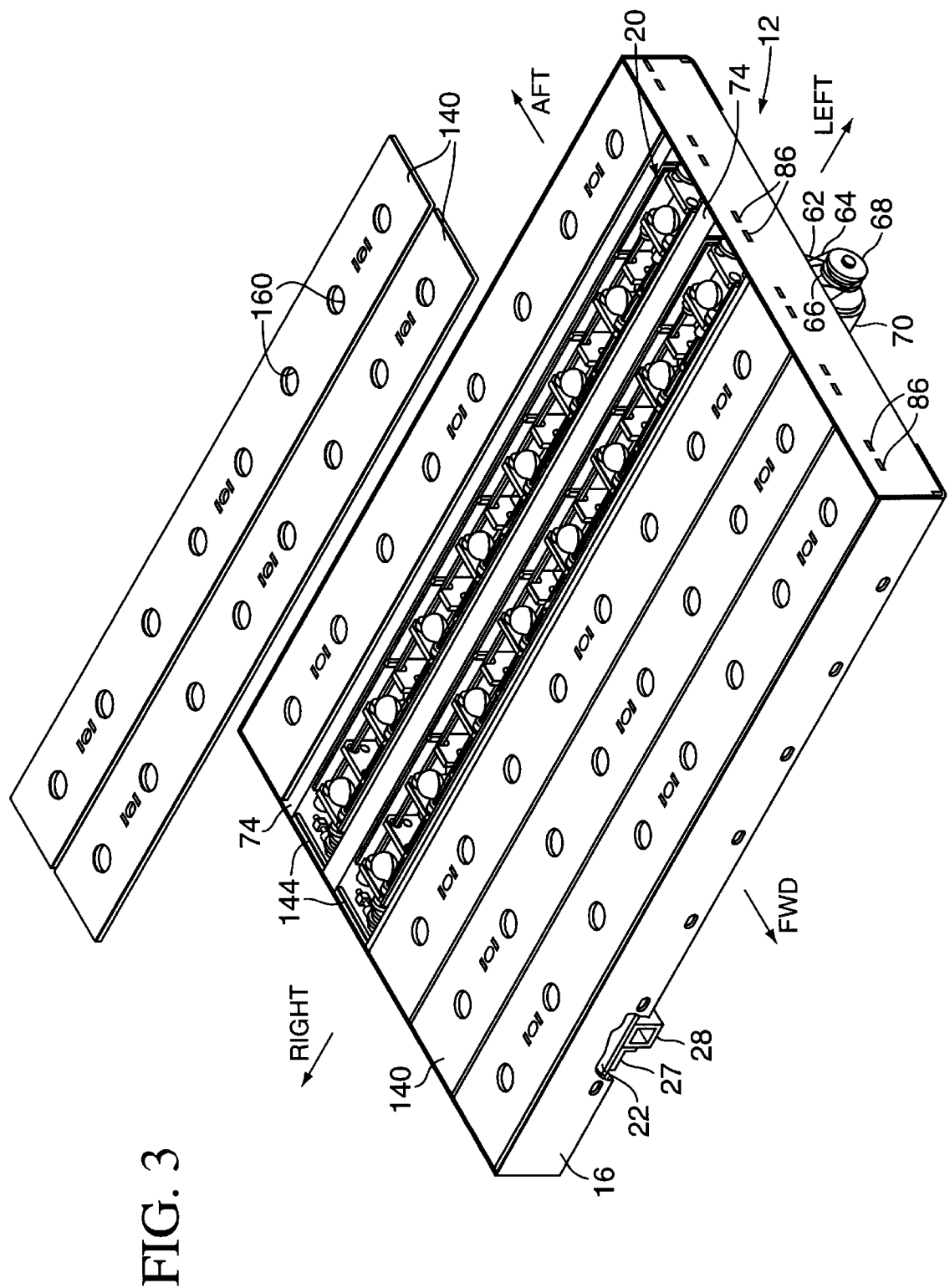
FIG. 3 is an isometric view of one half of the deck shown in FIG. 1 with two of the deck plates elevated to show the interior of the associated trays.

A spur gear 46 is secured to the drive shaft 30 just inboard of the support member 34 to the left of the right end member 35, as viewed in FIG. 5, and meshes with an identical gear, not shown, secured to a jack shaft 48 positioned below the drive shaft 30 and rotatably supported in bearings in the end support member 35 and the adjacent support member 34. Inner and outer sprockets 50 and 52, which for economy and ease of assembly may be integrated into a single unit, are secured to the portion of the jack shaft 48 which extends beyond the end member 35. Similarly, a spur gear 54 is secured to the portion of the drive shaft 32 extending beyond the left end member 35 and meshes with an identical gear secured to the protruding portion of jack shaft 56, which is supported in bearings in the end member 35 and the adjacent support member 34. Inner and outer sprockets 58 and 60 are secured to the portion of the jack shaft 56 extending beyond the end member 35. A chain, as represented by the lines 62 in FIGS. 2 and 3, is trained over the inner sprocket 50 on one of the trays 20 in the middle of the deck 12 and an inner sprocket 66 secured to the output shaft of a reversible electric motor 70. A chain 64 is trained over the outer sprocket 52 on the other of the middle trays and an outer sprocket 68 secured to the output shaft the motor 70. A separate chain, not shown, is trained over the outer sprocket 52 of the middle tray with its right shaft 30 driven by the motor 70 through its inner sprocket 50 and the outer sprocket 52 of the adjacent outboard tray. Another chain is trained over the inner sprocket 50 of the aforementioned adjacent tray and the inner sprocket of the tray outboard thereof. Similarly, the right drive shafts 30 of the tray just outboard of the tray with its right shaft 30 driven by motor 70 through its outer sprocket 52 is driven by a separate chain trained over their inner sprockets 50 and the drive shaft 30 of the other tray outboard thereof is driven by another chain trained over their outboard sprockets 52. Thus, all of the right drive shafts are driven in the same direction as determined solely by the direction of rotation of the motor 70. The left drive shafts 32 of all of the trays 20 are driven by a similar electric motor 72 through a similar chain drive arrangement, i.e. one of the middle trays being driven by a chain trained over outer sprockets and the other of the middle trays being driven by a chain trained over the inner sprockets and the left drive shafts in trays outboard of these middle trays being driven by chains trained over alternate sprockets. Thus, the direction of rotation of the shafts 32 is determined solely by the direction of rotation of the motor 72.

Adjustment of the tension in the chains is achieved by adjusting the position of the individual trays 20. Because the weight of an individual tray and the associated components makes shifting it laterally on the supporting box beams 28 difficult, an adjustment means is provided. A plurality of I-beams 74 extend transverse to, rest upon and are secured to the box beams 28. The I-beams 74 are positioned to form, either with the side frame or another I-beam, a cavity for each of the trays 20. A weld nut 76 is secured over each of two holes provided in each of the side plates 24 and 26. An adjusting bolt 78 has its threaded portion engaging each of the nuts 76 and its head bearing against the web of the adjacent I-beam 74 or side frame 16. The load imposed during chain slack adjustment, and the ensuing wear, will occur on the I-beam or side frame which is positioned on the side away from the direction the tray 20 must be moved to tighten the chain. Thus, while nuts 76 may be provided for both of the side plates 24 and 26, permitting interchangeability of trays, adjusting screws need only be provided on that side plate which is away from the direction the tray must be moved to tighten the chain. To distribute this load better and accommodate the increased wear at those points, a wear plate 80 is secured to the web of the I-beam. Once the adjusting bolts have been extended an amount to provide proper chain tension, the properly adjusted tray may be releaseably secured to the frame, as previously described.

In order to avoid deflections resulting from the chain tension acting on what would otherwise be essentially cantilever beams, the jack shafts 48 and 56 are also rotatably supported on their outer ends. A typical installation of such support is shown on the left of FIG. 5, wherein a self-aligning bearing 81 engages and rotatably supports the free end of the jack shaft 56. The housing 82 for the bearing 81 is provided with a pair of square openings for accepting carriage bolts 84 that extend through a pair of slots 86 in the side frame 16 to engage complementary nuts 88. A boss 90 is affixed to the inside of the side frame 16 adjacent the bearing 81 and has an essentially horizontal opening 92 extending therethrough. An adjusting tab 94 having a vertical slot to accommodate variations in the orientation of the opening 92 is trapped under the head of the carriage bolt 84 adjacent the boss 90 and the housing 82. A threaded extension 96 is affixed to the tab 94 extends through the opening in the boss 90 with a pair of nuts 98 and 100 engaging the threaded extension on each side of the boss. While the chain tension is being adjusted by movement of the tray, as explained in the paragraph above, the nuts 88 are loosened so the bearing 81 may move relative to the side frame 16 and the nuts 98 and 100 moved away from the boss 90 to permit unimpeded movement of the bearing. Once the tray is adjusted, the nuts 98 and 100 are tightened against the boss 90 so alignment of the self-aligning bearing 80 with the jack shaft 56 is within the range of acceptable limits, and the nuts 88 on the carriage bolts 84 are tightened to lock the bearing to the frame.

As described above, each driven ball 40 in the tray 20 bears on the wheels 36 and 38 and a ballmat comprising a freely rotatable support ball 42 in an essentially cylindrical retainer 44. The retainer 44 is positioned within a cavity formed by (i) a pair of side plates 102 and 104 affixed to the bottom plate 22 of the tray 20, (ii) a support plate 106 extending between and affixed to the side plates 102 and 104, and (iii) a pair of transverse plates 108 and 110 affixed to both the support plate 106 and the side plates 102 and 104. The support plate 106 is oriented to form an angle of about 30° from horizontal, and the transverse plates are essentially perpendicular thereto. A compression spring means, which may be a stack of belville or spring washers 112, is interposed between the retainer 44 and the support plate 106 to urge the retainer 44 and the support ball 42 retained thereby outward of the aforementioned cavity. The retainer 44 is trapped within the cavity by a retainer clip 114, which is generally U-shaped with a pair of guide legs 116 and 118 formed on the free end. The guide legs are spaced apart a distance substantially equal to the distance between the outer surfaces of the side plate 102 and 104. Locking portions 120 and 122 on the clip 114 are engageable with slots 124 and 126 formed in the side plates 102 and 104 respectively. The collar portion 128 of the clip 114 encircles the support ball, permitting engagement with the driven ball 40, and engages the top of the retainer 44. When the locking portions are in engagement with the slots 124 and 126, the spring washers 112 are slightly depressed and thus exert a force on the clip 114 to maintain it in such position. To facilitate removal of the clip 114, holes 130 and 132 are provided in extensions of the clip 114 and of the support plate 106 respectively, so that a pry bar, such a screw driver, may be inserted to pry the clip 114 out of the side plates 102 and 104.

When an excessively heavy load is imposed upon the driven ball 40, such as occurs when driven over by a lift-truck, for example, the spring washers 112 compress, allowing the support ball 42 to drop downward, i.e. move inward of the aforementioned cavity. This allows the driven ball 40 to pivot about its points of contact with the wheels 36 and 38 until it contacts a stop block 134. The stop block 134 is simply a solid member positioned between the side plates 102 and 104 and resting on the bottom plate 22. The load imposed on the driven ball 40, under such circumstances, is transferred directly to the frame through the stop block 134 and the bottom plate 22, preventing damage to the mechanism for driving and supporting the driven ball 40. A flange 136, which extends above the side plates 102 and 104, is formed on the stop block 134 and may be readily grasped by hand for placement and removal.

Figure 9:
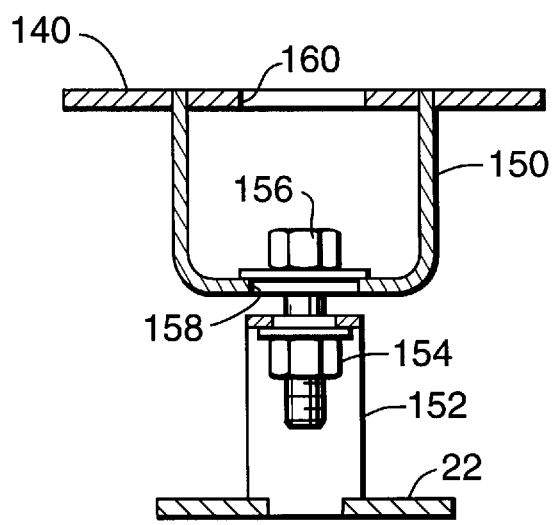
FIG. 9 is a side elevational view shown the means for removably securing the deck plate to the tray.
Figure 8:
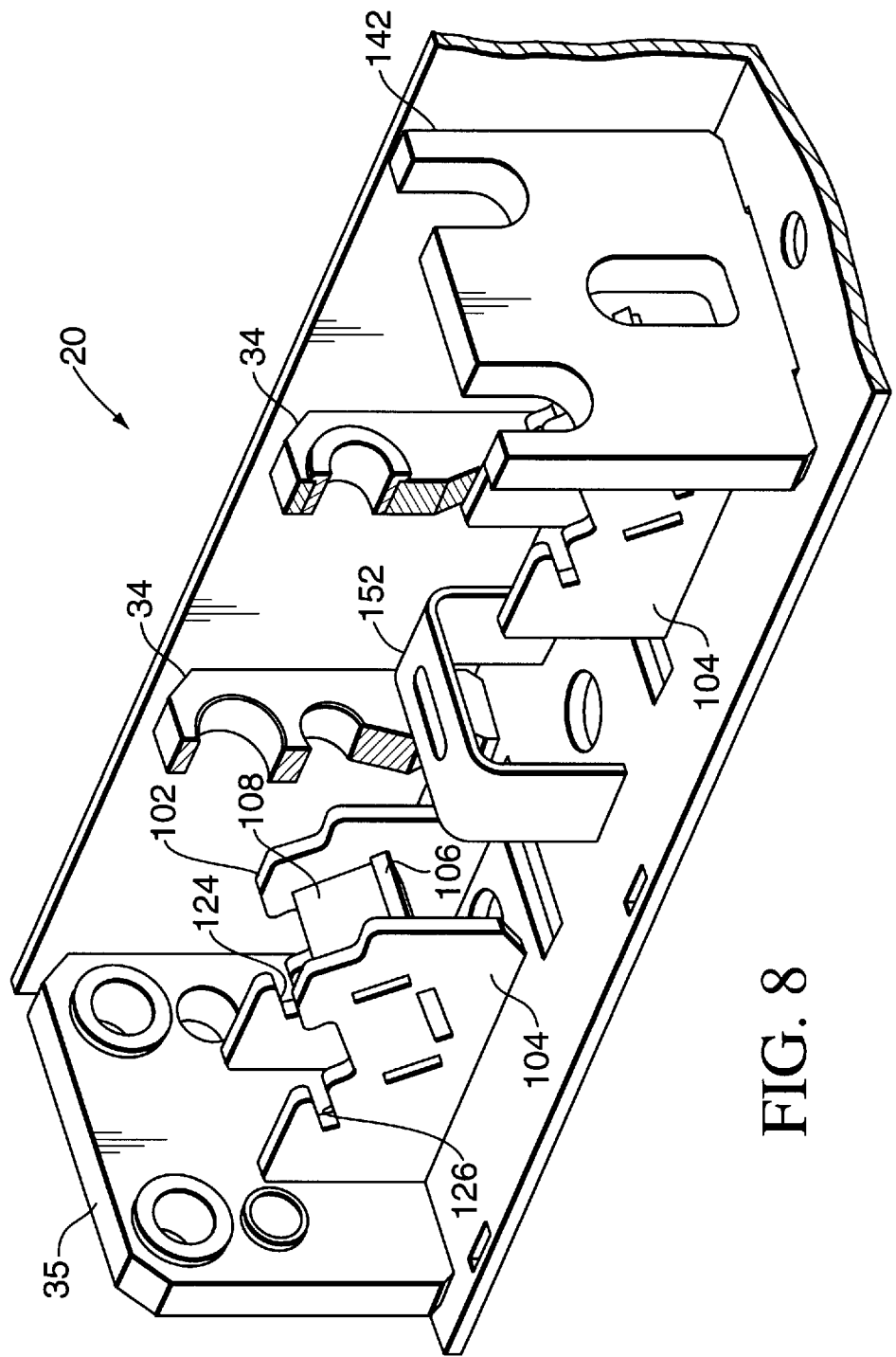
FIG. 8 is an isometric view, with portions broken away and eliminated for clarity, of a portion of the end of the tray shown in FIG. 4.

A deck plate 140 is provided for each tray 20 and rests upon the top of support members 34 and 35. In order to keep the thickness of the deck plate to a minimum, while having the necessary rigidity, additional support members 142, having notches to clear the drive shafts 30 and 32, are positioned between the support members 34, 35 and affixed to the bottom plate 22. The deck plate 140 is wider than its associated tray 20 so that the longitudinal edges rest on the upper flanges of the I-beams 74. Support bars 144 affixed to the inside of the side frame 16 support the ends of the deck plate 140, as well as the outer longitudinal edges of the deck plates associated with the outboard trays. The deck plate 140 is releaseably secured to the tray at a plurality of locations, a typical one being shown in FIG. 9. A U-shaped bracket 150 is affixed to the underside of the deck plate 140 and a similar bracket 152, oriented transverse to and positioned under the bracket 150, is attached to the bottom plate 22. A "U type" nut is slideably retained in a slot in the bracket 152 and engageable by a bolt extending through a slot 158 in the bracket 150. The head of the bolt 156 is accessible through a hole 160 in the deck plate 140 to facilitate tightening and loosening the bolt for adjustment of the plate 140 on the tray, as well as removal and reinstallation of the deck plate. The trays are preferably manufactured by cutting the piece parts from steel plates using a conventional laser cutter. The shape of each piece part is modified to be self-fixturing for welding the piece parts into a unitary structure. The modifications are the formation of one or more tabs on the part which terminates at the intersection with a mating parting, and the formation of slots in the mating part, which slots are complementary to the tab to be inserted therein. The tabs are equal to, or slightly less than, the thickness of the mating part so that the insertion of the tab on one part into the slot of the mating part orients the two parts. The weld is then made around the slot on the side opposite where the tab has been inserted.

While a preferred embodiment of the present invention is shown and described herein, it is to be understood that various changes and modification may be made without departing from the spirit of the invention as defined by the scope of the appended claims.

We claim:

1. A ball deck comprising:

a frame;

a plurality of driven balls arranged in a plurality of rows, a freely rotatable support ball supporting each driven ball;

a pair of drive shafts extending parallel and positioned on either side of the driven balls in each row;

a plurality of drive wheels secured to the drive shafts and arranged so that each driven ball is engaging one of the drive wheels on each of said pair of drive shafts;

a tray for each row of driven balls;

said tray having bottom, side and end plates;

bearing means in said end plates for rotatably supporting the drive shafts;

a pair of sprocket means, one secured to each shaft;

a chain means drivingly engageable with each of said sprocket means; and means for adjusting said tray to control the tension in said chain means and for releaseably securing said tray to said frame.

2. The invention according to claim 1, wherein said adjusting means comprises:

jacking means carried by each said tray and engageable with said frame for moving said tray to tighten the chain engaging the sprockets on the shafts in the associated said tray; and bolt means for releasably securing each said tray to said frame.

3. The invention according to claim 1 and further comprising:

a deck plate secured to each said tray having openings registering with said driven balls in the associated row.

4. The invention according to claim 3 wherein the means for securing each said deck plate comprises:

a first U-shaped bracket affixed to the associated said bottom plate and extending toward said deck plate;

a second U-shaped bracket affixed to said deck plate, extending toward the associated bottom plate and oriented transverse to said first bracket;

a slot in each of said brackets;

a nut slideably retained in one said slot;

a bolt extending thought the other said slot and engageable with said nut; and an opening in said deck plate to permit access to one of said nut and bolt.

5. A support for a driven ball in a ball deck comprising:

a bottom plate;

a pair of essentially vertical side plates secured to said bottom plate;

a pair of transverse plates extending between and secured to said side plates;

a support plate extending between and secured to said transverse plate and to said side plates;

said support plate, transverse plates; and side plates forming a cavity;

a ballmat, including a freely rotatable support ball capable of supporting the driven ball, positioned within said cavity;

spring means interposed between said support plate and said ballmat for urging the later outward of said cavity;

a retainer engageable with said side plates and contacting said ballmat to hold said ballmat within said cavity; and said retainer slightly depressing said spring means when engaged with said side plates so that said spring means also serves to hold said retainer in place.

6. The invention according to claim 5 and further comprising;

a support block positioned between a said side plates and resting on said bottom plate;

said driven ball normally being in contact with said support ball and spaced from said support block; and said support block coming into contact with said driven ball to transfer the load imposed on said driven ball directly to said bottom plate when such load exceeds the force of said spring means.

\* \* \* \* \*